United States Patent [19]
Koyama

[11] Patent Number: 5,485,438
[45] Date of Patent: Jan. 16, 1996

[54] METHOD AND APPARATUS FOR OPTICALLY RECORDING AND/OR REPRODUCING INFORMATION

[75] Inventor: Osamu Koyama, Yokohama, Japan

[73] Assignee: Canon Kabushiki Kaisha, Tokyo, Japan

[21] Appl. No.: 133,871

[22] Filed: Oct. 12, 1993

[30] Foreign Application Priority Data

Oct. 12, 1992 [JP] Japan .................................. 4-298214

[51] Int. Cl.$^6$ .............................. G11B 7/095; G11B 7/00
[52] U.S. Cl. ......................................... 369/44.28; 369/111
[58] Field of Search .............................. 369/44.28, 44.29, 369/111, 44.37, 44.38, 50, 60, 121; 360/77.02, 77.08, 77.11, 74.1

[56] References Cited

U.S. PATENT DOCUMENTS

| | | | |
|---|---|---|---|
| 4,982,390 | 1/1991 | Tanaka | 369/60 X |
| 5,109,370 | 4/1992 | Muramatsu | 369/60 |
| 5,208,792 | 5/1993 | Imanaka | 369/44.38 |
| 5,303,215 | 4/1994 | Dewar et al. | 369/111 |

FOREIGN PATENT DOCUMENTS

| | | | |
|---|---|---|---|
| 51-107121 | 9/1976 | Japan . | |
| 54-146613 | 11/1979 | Japan . | |
| 0216172 | 9/1986 | Japan | 369/111 |
| 62-175948 | 8/1987 | Japan . | |
| 0113984 | 5/1988 | Japan | 369/111 |
| 63-268103 | 11/1988 | Japan . | |
| 64-19535 | 1/1989 | Japan . | |
| 64-82348 | 3/1989 | Japan . | |
| 0069857 | 3/1992 | Japan | 369/111 |
| 2125204 | 2/1984 | United Kingdom | 369/111 |

OTHER PUBLICATIONS

"Multi–Beam Optical Disk Drive for High Data Transfer Rate Systems", Japanese Journal of Applied Physics, vol. 31, No. 2B, published Feb., 1992, pp. 630–634.

IBM Technical Disclosure Bulletin, Dec., 1975, vol. 18, No. 7, pp. 2292–2293.

Patent Abstracts of Japan, vol. 16, No. 167, English Abstract of Japanese Patent No. 04–014,623, published Apr. 22, 1992.

Patent Abstracts of Japan, vol. 11, No. 287, English Abstracts of Japanese Patent No. 62–084,441, published Sep. 17, 1987.

Primary Examiner—Andrew L. Sniezek
Assistant Examiner—Thang V. Tran
Attorney, Agent, or Firm—Fitzpatrick, Cella, Harper & Scinto

[57] ABSTRACT

Disclosed is an optical information recording and/or reproducing system for recording or reproducing information in parallel from a first point towards a second point in which at least (N+1) numbers of track turns are herein provided between the first and second points on a helical track by converging, when N is an integer being two or larger than two, N numbers of light beams respectively at N numbers of track turns adjacent to each other in the radial direction of the helical track on an optical information recording medium and positioning the light beams to form N numbers of beam spots through an optical system. Any portion of the information by N numbers of beam spots is recorded or reproduced from a third point between the first and second points towards the second point. The beam spots are moved from the second point in the radial direction of the helical track so that at least one or more beam spots of N numbers of beam spots come in front of the first point in a scanning direction of the beam spots. Other segments of the information are recorded or reproduced from the first point towards the third point by using at least one or more beam spots.

17 Claims, 12 Drawing Sheets

METHOD AND APPARATUS FOR OPTICALLY RECORDING AND/OR REPRODUCING INFORMATION

BACKGROUND OF THE INVENTION

1. Field of the Invention

The present invention relates to an optical information recording and/or reproducing system and, especially, to an optical information recording and/or reproducing system for recording or reproducing information in parallel on or from a recording medium such as an optical disk by a plurality of laser light sources.

2. Related Background Art

In recent years, research and development for improving a transfer rate for transferring data have been energetically conducted with respect to an optical information recording/reproducing apparatus, such as a magneto-optic disk apparatus. In the magneto-optic disk apparatus offered as a product at the present, the disk must make three revolutions for erasing/recording/reproducing (verifying) processes when writing data. Such magneto-optic disk apparatus have a substantially lower data transfer rate than that of an apparatus using a hard disk.

Under such circumstances, there have been proposed an overwritable information recording medium and an optical information recording/reproducing apparatus capable of overwriting, wherein recording and erasing processes are performed for a duration of one revolution of the disk. An optical information recording/reproducing apparatus for verifying information immediately after recording by use of a plurality of beam spots and an optical information recording/reproducing apparatus for recording and/or reproducing the information in parallel by employing the plurality of beam spots has also been proposed. For instance, a system for modulating a magnetic field applied to a magneto-optic recording medium in accordance with the information recorded on the recording medium has been proposed in the form of a magneto-optic disk apparatus capable of overwriting. Also proposed in addition to the above system was a magneto-optic disk apparatus capable of performing all the erasing/recording/reproducing processes for a duration of one revolution of the disk, thereby enhancing the data processing speed of the magneto-optic disk. This is accomplished by irradiating a track on the disk with a plurality of light beams for use of recording and verifying as well to form beam spots, respectively. Such systems are all based on a magnetic field modulation overwrite system for recording the information by modulating the magnetic field applied to the magneto-optic recording medium. On the other hand, there has also been proposed a magneto-optic recording medium which is overwritable by modulating the light beams for writing the information. This recording medium has a structure in which multi-layered magnetic films having different Curie temperatures and coercive forces are exchange-coupled. The recording medium is employed in the magneto-optic recording/reproducing apparatus of the optical modulation overwrite system. Further, there has been proposed an apparatus for recording and reproducing information in parallel by forming a plurality of beam spots on track turns adjacent to each other on the magneto-optic recording medium. This apparatus records and reproduces in parallel by use of substantially the same magneto-optic disk apparatus as the conventional one employing a single light source, by using a semiconductor laser array as a light source. In this manner, the magneto-optic disk apparatus is capable of enhancing the data transfer rate up to the level of a hard disk or higher by exploiting the capability of multiplexing the plurality of light beams.

There is known e.g., a technique of recording and reproducing the information by forming beam spots in parallel respectively on a plurality of track turns adjacent to each other in the radial direction of a recording medium when irradiating a magneto-optic recording medium with beams emitted from a semiconductor laser array. In this case, the recording and reproduction of the information at a high transfer rate can be easily attained by using the magneto-optic recording medium having a helical track. The following problems, however, arise when the magneto-optic disk apparatus capable of recording and reproducing the information in parallel by use of the plurality of beam spots records and reproduces the information in parallel on and from the magneto-optic recording medium, presently available as a product having a single helical track. This will be explained with reference to FIGS. 1 and 2. FIG. 1 schematically illustrates the magneto-optic recording medium having a helical track. In FIG. 1, the numeral 1 represents a center of revolution; 2 designates a single helical track; and an arrowhead indicates a direction of revolution of the recording medium. Beam spots 3-1, 4-1 of the magneto-optic disk apparatus for recording and reproducing the information in parallel as described above are positioned on track turns adjacent to each other. For instance, it is assumed that the beam spot 3-1 starts recording the information from an arbitrary point A on the magneto-optic recording medium. It is similarly assumed that the beam spot 4-1 starts recording the information from a point B. The points A, B are, as is obvious from the Figure, located in close proximity on track turns adjacent to each other. In this state, when the magneto-optic recording medium makes one revolution, that is, explaining the revolution of this magneto-optic recording medium with the aid of movements of the beam spots, the two beam spots come on the downstream side for one track upon recording the information for the one track. More specifically, the beam spot 3-1 reaches the point B, while the beam spot 4-1 comes to the point C. The beams spots moved are expressed by numerals 3-2, 4-2, respectively.

If the recording information exists over two or more tracks, however, as illustrated in FIG. 2, for example, the beam spot 3-2 is required not to overwrite the information already recorded by the beam spot 4-1 from the point B. For this purpose, the two beam spots have to jump tracks to adjacent track turns. It is, however, impossible to instantaneously move to the adjacent tracks. Hence, a recordable state is not present until a track jumping time or a tracking servo settling time after jumping has taken place. This will be explained referring to FIG. 2. The beam spot 3-2 is incapable of recording until the beam spot 3-2 jumps the track from the point B and reaches a point c. The beam spot 4-2 is similarly incapable of recording until the beam spot 4-2 jumps the track from the point C and reaches a point d. Namely, at least a portion (C-c) corresponding to a section L is not effectively used. When the information is continuously recorded on the magneto-optic recording medium, and if continuously recorded on, e.g., an A-E section, the C-c section is blank, or a completely different item of information already recorded on the medium may be left in case the magneto-optic recording medium is overwritable. Then, when making an attempt to reproduce the above recording information by the magneto-optic disk apparatus serving as a recording/reproducing means using the single beam spot which is now being manufactured into reproducing apparatuses, it can be easily imagined that some drawbacks appear therein. That is, it is difficult to make compatible a magneto-optic disk apparatus capable of recording and reproducing the information in parallel and a magneto-optic disk apparatus using a single beam spot. This is quite inconvenient. Further, a wait for revolution without jumping the track may be possible for avoiding the above-stated situation until the beam spot 3-2 reaches the point C, and the beam spot 4-2 comes to the point D. If this is done, however, the enhanced transfer rate made possible by simultaneously recording and/or reproducing the information with the plurality of beam spots cannot be taken advantage of.

SUMMARY OF THE INVENTION

It is a primary object of the present invention, which has been devised in the light of the above problems, to provide an optical information recording and/or reproducing system (apparatus) for efficiently recording and reproducing information in parallel, in which no invalid recording area is produced even when jumping tracks. Further, according to the present invention, the compatibility with an apparatus for recording or reproducing information with a single light beam can be maintained. According to a first system of the present invention, there is provided an optical information recording and/or reproducing method of recording or reproducing information in parallel from a first point towards a second point in which at least (N+ 1) numbers of track turns are herein provided between the first and second points on a helical track by converging, when N is an integer at least equal to two, and N numbers of light beams respectively are on N numbers of track turns adjacent to each other in the radial direction of the helical track on an optical information recording medium and the light beams are positioned to form N numbers of beam spots by an optical system. The method comprises the steps of recording or reproducing some segment of the information with N numbers of beam spots from a third point between the first and second points towards the second point and moving the beam spots from the second point in the radial direction of the helical track so that at least one or more beam spots of N numbers of spots come in front of the first point in a scanning direction of the beam spots. The method further comprises the step of recording or reproducing other segments of the information from the first point towards the third point by at least one or more beam spots.

Other systems and constructions of the present invention will become apparent during the following discussion.

DESCRIPTION OF THE PREFERRED EMBODIMENT

Figure 1:
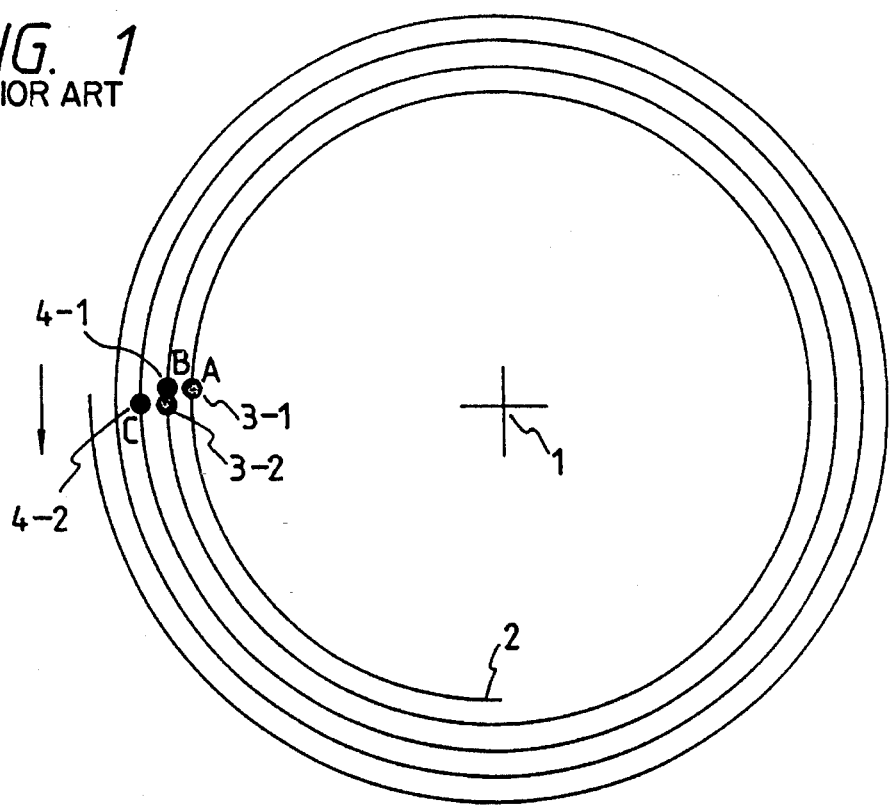
FIG. 1 is an explanatory view showing a conventional problem in the prior art.
Figure 2:
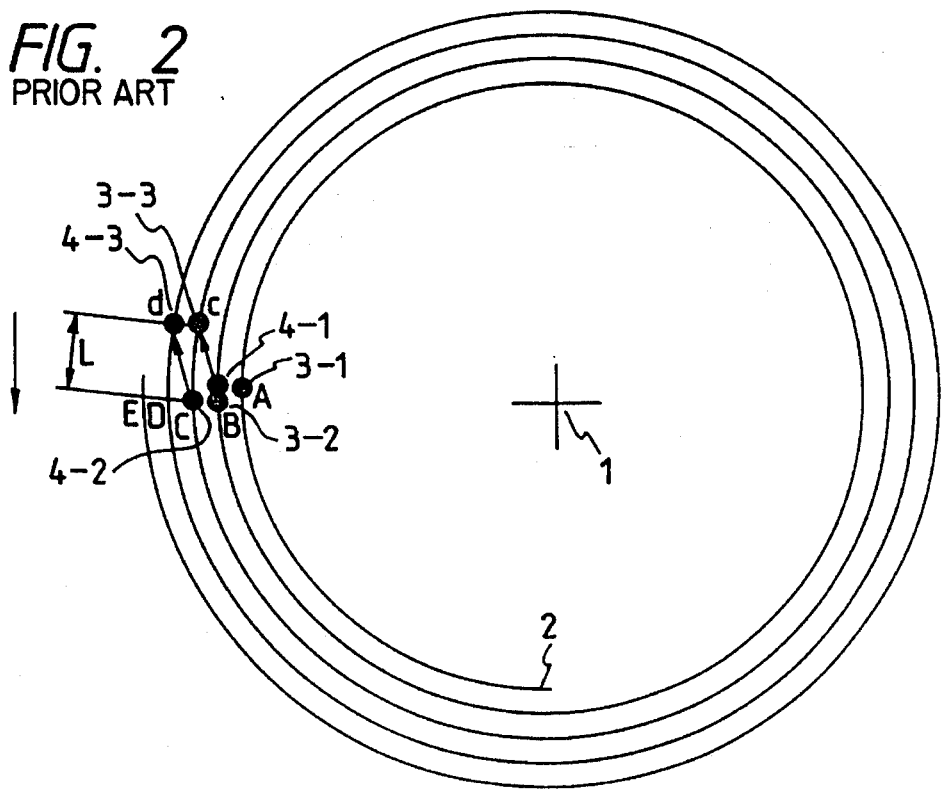
FIG. 2 is an explanatory view showing a conventional problem in the prior art.
Figure 4:
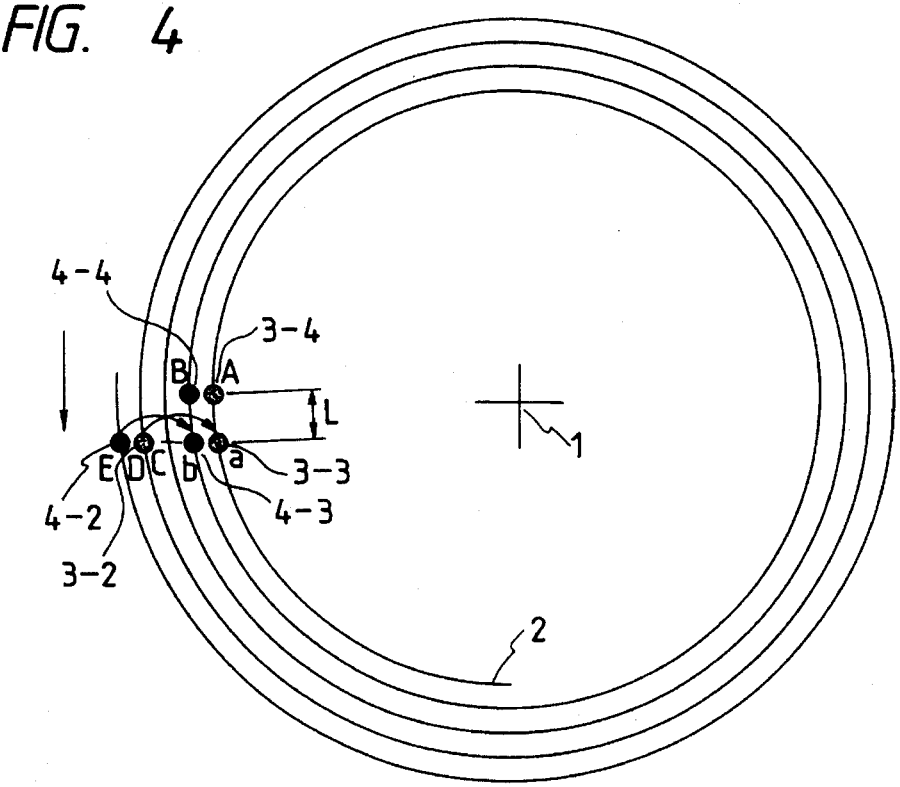
FIG. 4 is an explanatory view illustrating the information recording/reproducing system of this invention.
Figure 5:
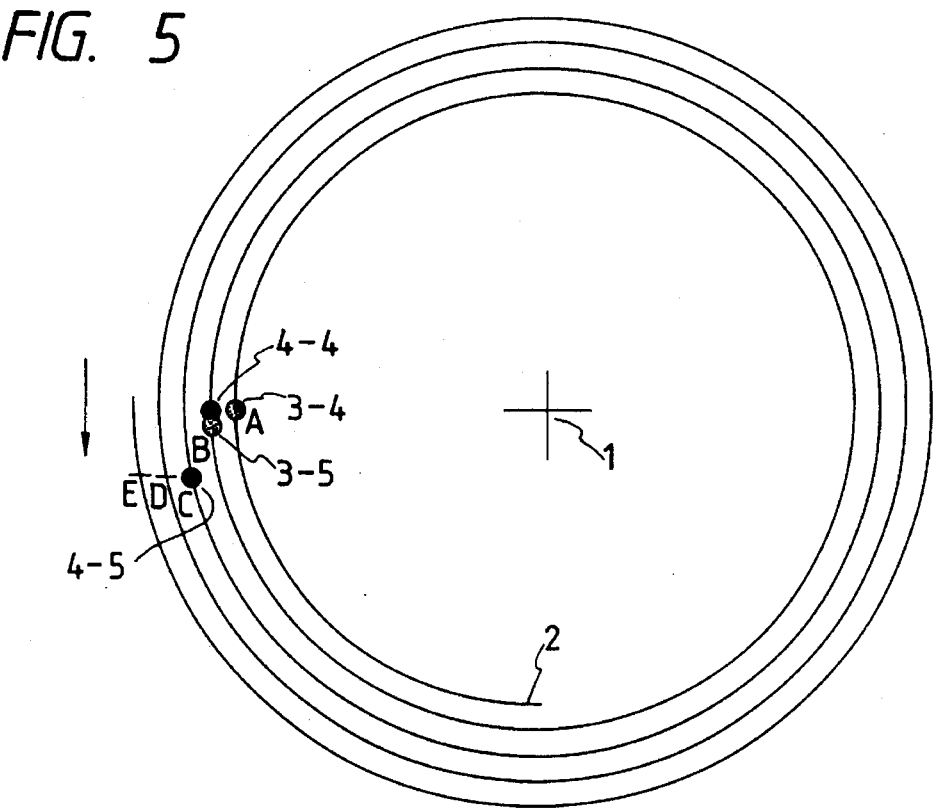
FIG. 5 is an explanatory view illustrating the information recording/reproducing system of this invention.
Figure 6:
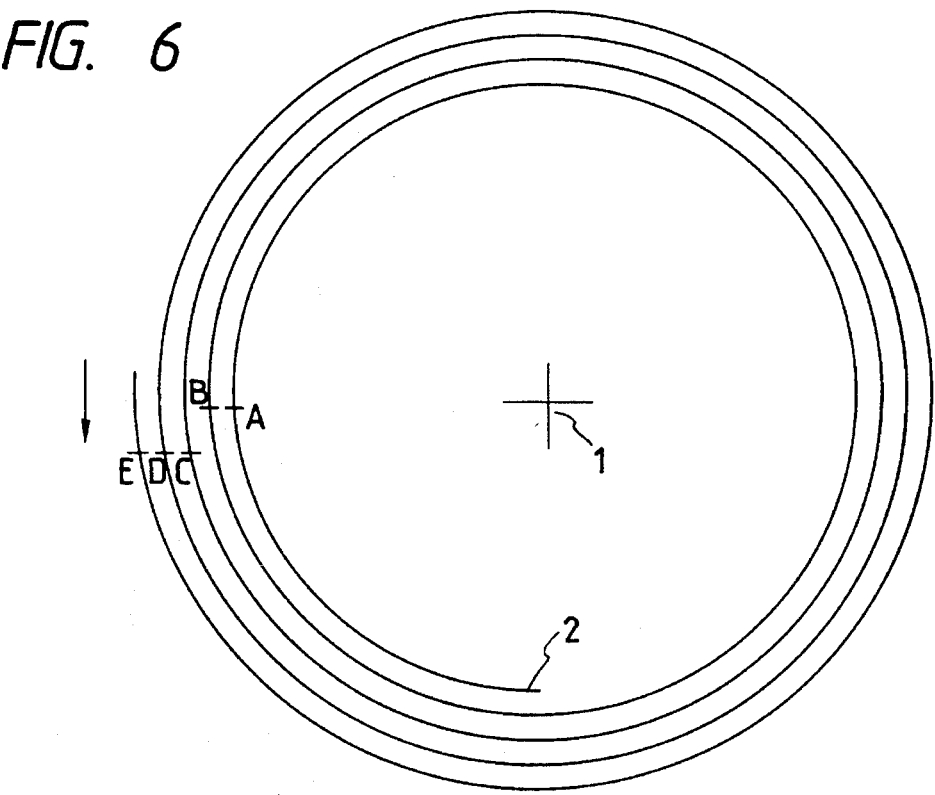
FIG. 6 is an explanatory view illustrating the information recording/reproducing system of this invention.

A first embodiment of the present invention will hereinafter be described in detail with references to FIGS. 3 through 9. To start with, the principle of a recording system according to this invention will be discussed with reference to FIGS. 3 to 6. For instance, FIG. 6 schematically illustrates a magneto-optic recording medium having a single helical track 2 identical with the one shown in FIGS. 1 and 2. Herein, points A to E irradiated with beam spots are located astride four track turns adjacent to each other. Now, it is considered that continuous bits of information on one or more track turns are to be recorded. The information, it is assumed, starts at A and ends at E via B, C, D in sequence. The point B is located further downstream than the point A as well as on the track turn substantially adjacent to the point A. The point C lies further downstream of the track and on the track turn adjacent to the point B. The point C lies in such a position that a track position further downstream than B is reachable by jumping the track to the adjacent track turn positioned at more upstream of the track than C. Similarly, the point D is located on the downstream track turn adjacent to C. The point E is also located on the downstream track turn adjacent to D.

Figure 3:
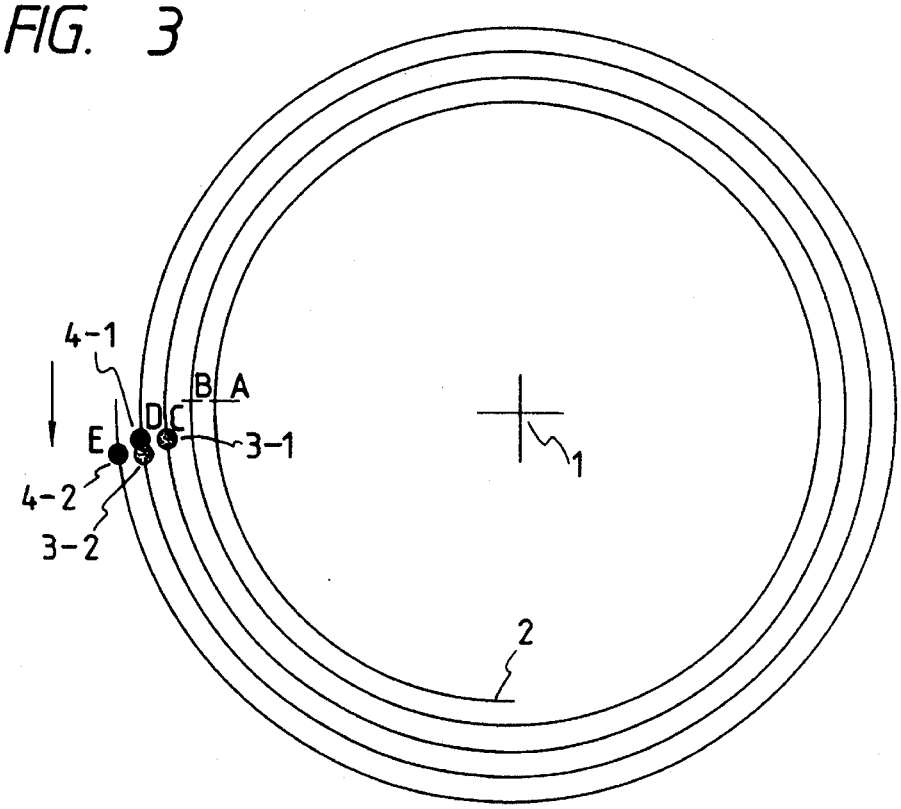
FIG. 3 is an explanatory view illustrating an information recording/reproducing system of this invention.

According to the recording system of this invention on the magneto-optic recording medium, at the first onset of recording, as depicted in FIG. 3, two beam spots 3-1, 4-1 are disposed adjacent to each other and astride the two track turns. The beam spots 3-1, 4-1 simultaneously start recording in parallel from the above-mentioned points C, D. That is, recording is started from the middle of continuous bits of information A to E. As in the same way with FIGS. 1 and 2, revolutions of an optical disk will be explained with the aid of movements of the beam spots. When finishing the recording for one-track, the beam spot 3-1 comes to the point D, while the beam spot 4-1 reaches the point E. The beam spots at that moment are expressed by numerals 3-2, 4-2, respectively. Next, the beam spot 3-2 jumps the track so as not to overwrite the information already recorded by the beam spot 4-1. This situation is illustrated in FIG. 4. Herein, the beam spots 3-2, 4-2 located at D, E jump the tracks over to respective points a, b located upstream by 3 track turns. The points a, b are located further upstream by L than A, B. Herein, L is identical with the quantity L explained in FIGS. 1 and 2. L corresponds to a track jumping time or a settling time of a tracking servo after jumping and is just a distance at which the beam spot moves for that time. A, B are points at which the beam spots 3-3, 4-3 moving to the points a, b become capable of recording and resume the recording operation. From these points, there is recorded the information (from the beginning to the mid-part thereof) preceding the information already recorded (from the mid-part to the end thereof). As a result, as illustrated in FIG. 5, the beam spots 3-4, 4-4 resuming recording from the points A, B record the information of approximately one track. The former beam spot finishes recording all at the point B (a beam spot 3-5), while the latter beam spot finishes recording all at the point C (a beam spot 4-5). The recording of the information existing astride about 4 track turns across points A to E shown in FIG. 6 can be thereby completed.

Figure 7:
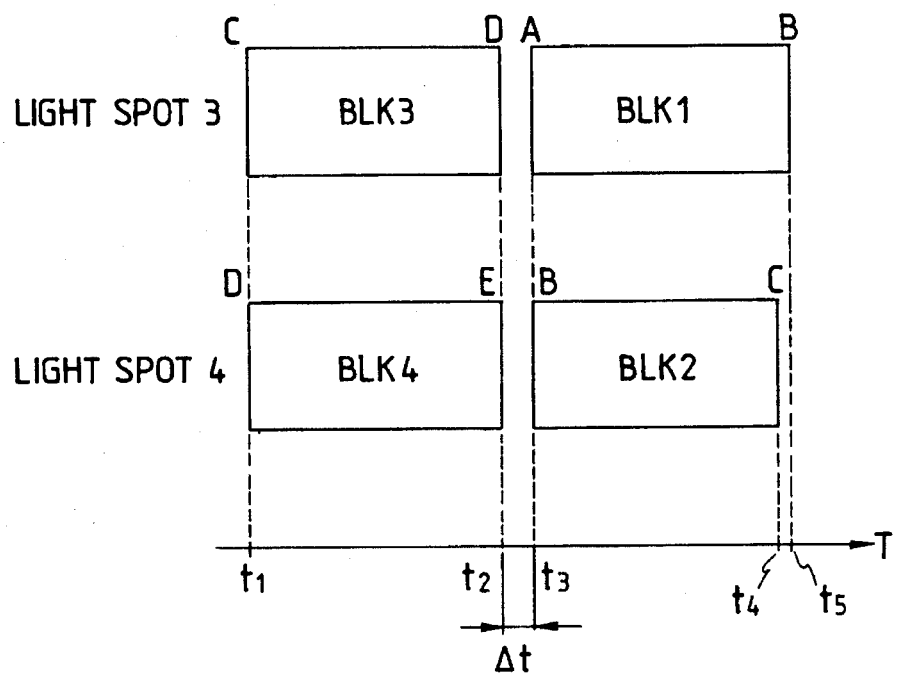
FIG. 7 is an explanatory view illustrating the information recording/reproducing system of this invention.
Figure 8:
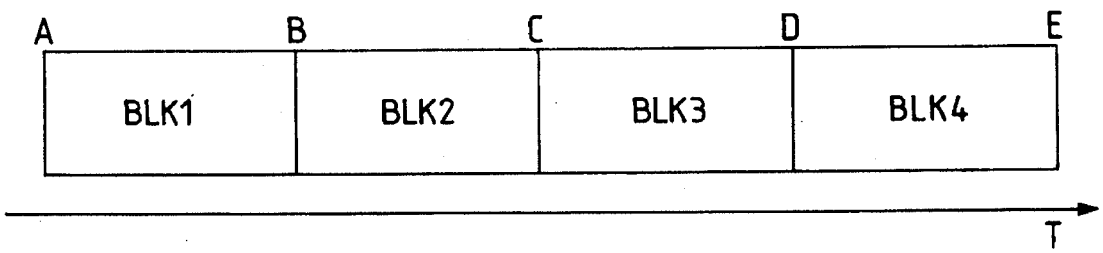
FIG. 8 is an explanatory view showing the compatibility between a recording medium according to the present invention and a conventional apparatus.

Next, a process of recording the information will be explained in a time sequence by referring FIG. 7. The beam spots 3-1 through 3-5 in FIGS. 3 to 6 are all the same and are therefore, in FIG. 7, shown as a beam spot 3. Similarly, the beam spots 4-1 through 4-5 are expressed as a beam spot 4. Then, the information recorded on the recording medium is expressed in the form of data sequences BLK1 to BLK4. A to E represents individual points on the track of the recording medium and relate FIGS. 3 to 6 to FIG. 7. The axis of the abscissa in FIG. 7 indicates a time T. When T=$t_1$, the beam spot 3 records the data sequence BLK3 from the point C, while the beam spot 4 records the data sequence BLK4 from the point D. When T=$t_2$, the recording medium makes one revolution. The beam spot 3 reaches D, and the beam spot 4 comes to E. Then, the track jumping action continues till T=$t_3$, but no recording is performed during a time given by $\Delta t = t_3 - t_2$. When T=$t_3$, the beam spot 3 reaches the point A, while the beam spot 4 reaches the point B. Accordingly, the data sequences BLK 1, BLK 2 are recorded therefrom. When T=$t_4$, the beam spot 4 reaches C and completes recording. When T=$t_5$ immediately thereafter, the beam spot 3 comes to B and similarly finishes recording. It therefore follows that the information existing astride approximately four track turns is recorded in about one-half of the time as compared to using the normal single beam spot. The thus recorded bits of information are physically arranged in sequence such as BLK1 to BLK4 from the points A to E. Therefore, for instance, when reproducing the data by means of a magneto-optic disk apparatus for recording/reproducing the data with the single beam spot, the data sequences BLK1 to BLK4 continuous from the points A to E on the recording medium can be, as illustrated in FIG. 8, recorded in this order.

Figure 9:
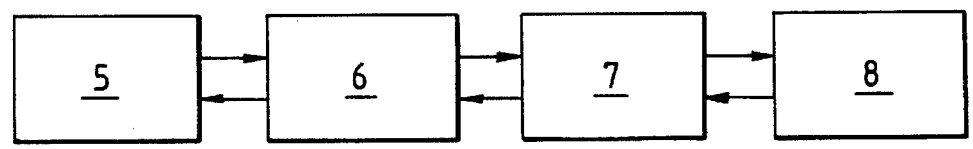
FIG. 9 is a view showing a construction of an information recording and/or reproducing apparatus of this invention.

The magneto-optic disk apparatus adopting the system according to this invention will be explained with reference to FIG. 9. Paying attention to FIG. 9, the numeral 5 designates a host device, e.g., a host computer for imparting the information to be recorded and reproduced by the magneto-optic apparatus of this invention. A buffer memory 6 temporarily stores the information given from the host device 5. A control means 7 properly determines a recording or reproducing permutation of the information from an information quantity thereof for parallel recording and reproduction. A magneto-optic head driving means 8 positions a plurality of beam spots on a plurality of track turns adjacent to each other with the intention of recording and reproducing the information in parallel. When the information to be recorded is prepared for, e.g., four tracks, the control means 7 divides the information into the data sequences BLK1 to BLK4 as explained so far in FIGS. 3 to 8. The magneto-optic head driving means 8 is operated to effect the parallel recording on the recording medium. Further, in the case of reproducing the recorded information, the magneto-optic head driving means 8 is operated to reproduce the data sequences in the same order as recording. The bits of information are rearranged correctly in BLK1 to BLK4 and are stored in the buffer 6. As described above, absolutely in the same way as that explained in FIGS. 3 to 8, the control means 7 works for reading and reproducing the information in parallel by use of the plurality of beam spots.

Figure 10:
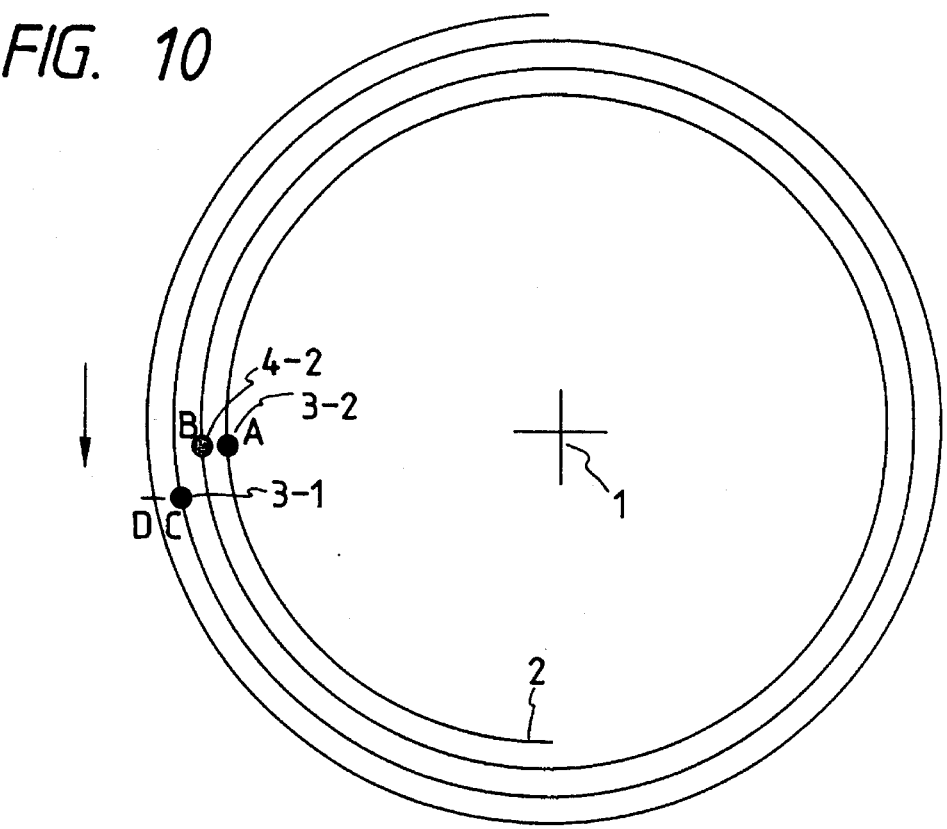
FIG. 10 is an explanatory view showing optimization of the information recording/reproducing system of this invention.
Figure 11:
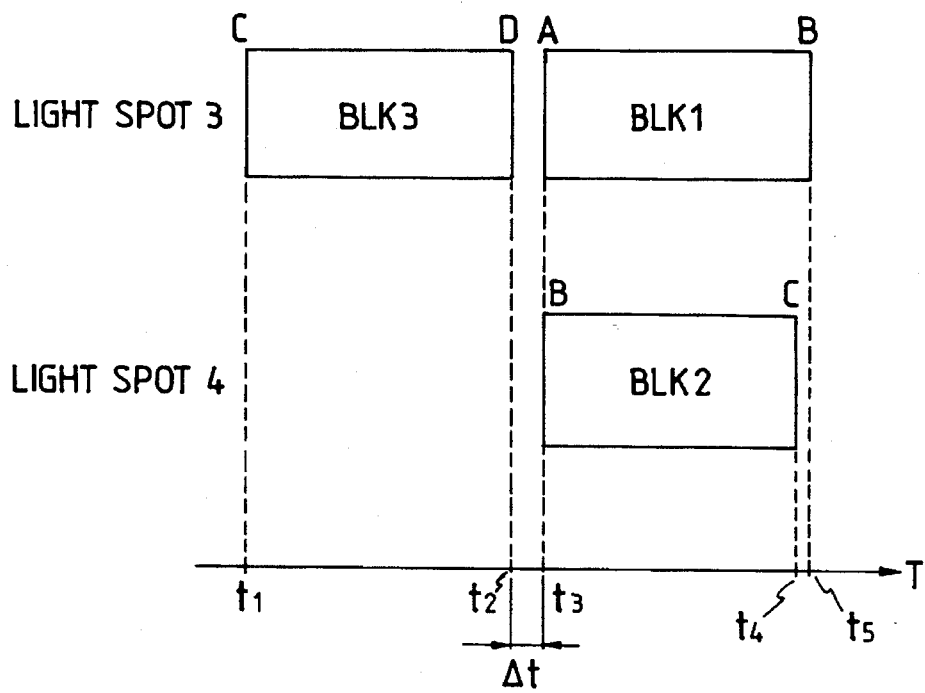
FIG. 11 is an explanatory view showing the optimization of the information recording/reproducing system of this invention.

Now, there has been explained the example where the information can be recorded and reproduced at the highest efficiency with reference to FIGS. 3 to 8. As a matter of fact, however, the information quantity is not restricted to the quantity for the four tracks, but various information quantities may be given. Then, some consideration will be given to an efficient magneto-optic recording/reproducing system using the plurality (two) of beam spots. To begin with, when the information is of a quantity smaller than one track, there is no merit in performing the parallel recording and reproduction with the two beam spots. It is therefore better to execute the parallel recording and reproduction with only one beam spot. Further, if the information quantity is larger than one track but equal to or smaller than two tracks, as explained in the conventional example, the information is partitioned into the data sequences BLK1, BLK2. The respective data sequences are recorded and reproduced in parallel by employing the beam spots, 3, 4 (see FIG. 1). Then, if the information quantity is larger than two tracks but less than three tracks, the system of this invention becomes effective. Namely, for simplicity, if it is considered that the information existing astride three track turns is recorded and reproduced in parallel, a system shown in FIGS. 10, 11 will be exemplified. Turning to FIG. 10, the information is continuous astride the three track turns across the points A to D. It is assumed that the information starts at A and ends at D via B, C in sequence. A positional relationship between the points A to D on the track is the same as that explained in FIGS. 3 to 6. This information is, as depicted in FIG. 11, partitioned into the data sequences BLK1 TO BLK3. When T=$t_1$, the record (reproduction) is started from BLK3 by using only the beam spot 3 (3-1 in FIG. 10). At this point in time, a beam spot 4 may not be lit up or may be lit up at a reproducing power level. After finishing recording (reproduction) for one track, and when T=$t_2$, the beam spot 3 reaches the point D. Then, the beam spots jump three track turns (not illustrated in FIG. 10). The beam spot 3 thus moves upstream of the point A. The beam spot 4 moves upstream of the point B. When T=$t_3$, the beam spots 3, 4 come to A, B. Hereat, recording (reproduction) is started (shown by the beam spots 3-2, 4-2 in FIG. 10). Thereafter, the beam spots 3, 4 record (reproduce) the data sequences BLK1, BLK2. When T=$t_4$, the beam spot 4 reaches C, thereby finishing recording (reproduction). When T=$t_5$, the beam spot 3 reaches B, similarly recording (reproduction) is ended. Further, when T=$t_1$, recording (reproduction) may be started from BLK3 by using only the beam spot 4 instead of the beam spot 3. In this case, when T=$t_2$, the beam spot 4 comes to D. Hereat, the beam spot may jump two track turns in the upstream direction (the action is thereafter the same as the above-mentioned).

Figure 12:
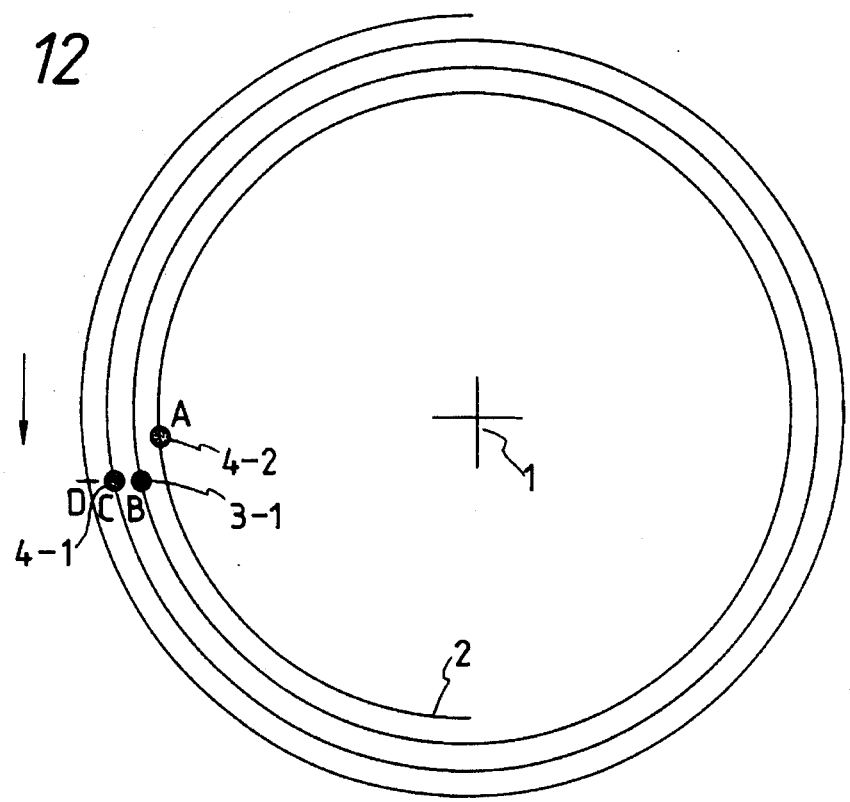
FIG. 12 is an explanatory view showing the optimization of the information recording/reproducing system of this invention.
Figure 13:
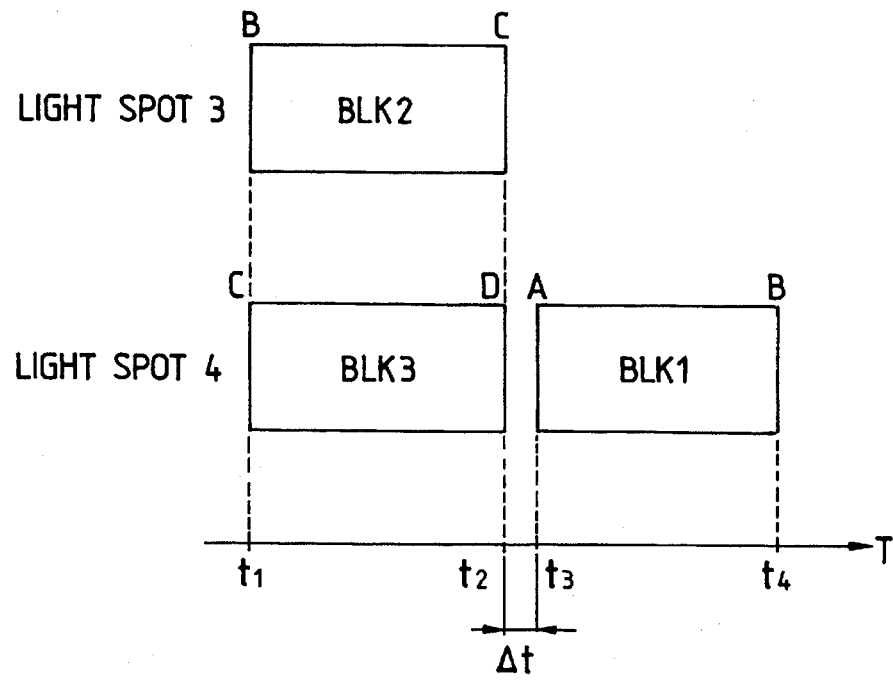
FIG. 13 is an explanatory view showing the optimization of the information recording/reproducing system of this invention.

FIGS. 12 and 13 illustrate a second system when the information quantity is less than three tracks. Paying attention to FIG. 12, the information is recorded continuously astride the three track turns across the points A to D. It is presumed that the information starts at A and ends at D via B, C in sequence. A difference from FIGS. 3 to 6 is that the point B is located further upstream than C and is close proximity to the point C on the adjacent track turn. The information is as illustrated in FIG. 13, partitioned into data sequences BLK1–BLK3. When T=$t_1$, recording (reproducing) is initiated respectively from BLK2, BLK3 by using the beam spots 3, 4 (3-1, 4-1 in FIG. 12). When T=$t_2$, recording (reproduction) for one track is ended. The spots 3,4 when reaching C, D respectively, jump by three tracks (not shown in FIG. 12). The beam spot 4 moves upstream of the point A. At this time, a light source corresponding to the beam spot 3 may not be lit up or may be lit up at the reproducing power level. When T=$t_3$, the beam spot 4, when coming to A, starts recording (reproducing) (the beam spot 4-2 in FIG. 12). Thereafter, the beam spot records (reproduces) the data sequence BLK1. When T=$t_4$, the beam spot 4 finishes recording (reproducing) upon reaching the point B. In this case, substantially when T=$t_3$–$t_4$, the parallel recording/reproducing process is not conducted. Further, when T=$t_3$, the data sequence BLK1 may be recorded (reproduced) by using only the beam spot 3 in place of the beam spot 4. In this instance, when T=$t_2$, the beam spot 3 may jump two tracks in the upstream direction upon reaching C. At this moment, a light source corresponding to the beam spot 4 may not be lit up or may be lit up at the reproducing power level. Additionally, in the meantime, verification of recording may be performed by employing the beam spot 4.

The present invention has been explained so far. However, the first and second systems are, it cannot be said, expedient measures when applied to recording and reproducing of a slightly larger amount of information than two tracks. The reason for this will be elucidated by considering that the data sequence is shortened in FIGS. 11 and 13. It is because there increases a revolution wait time until the beam spots 3, 4 jump the tracks and then reach the points A, B respectively after finishing the recording and reproduction of the data sequence BLK3 according to the first system. Further, according to the second system, there decreases a time for effecting the parallel recording and reproduction when T=$t_1$–$t_2$.

Figure 14:
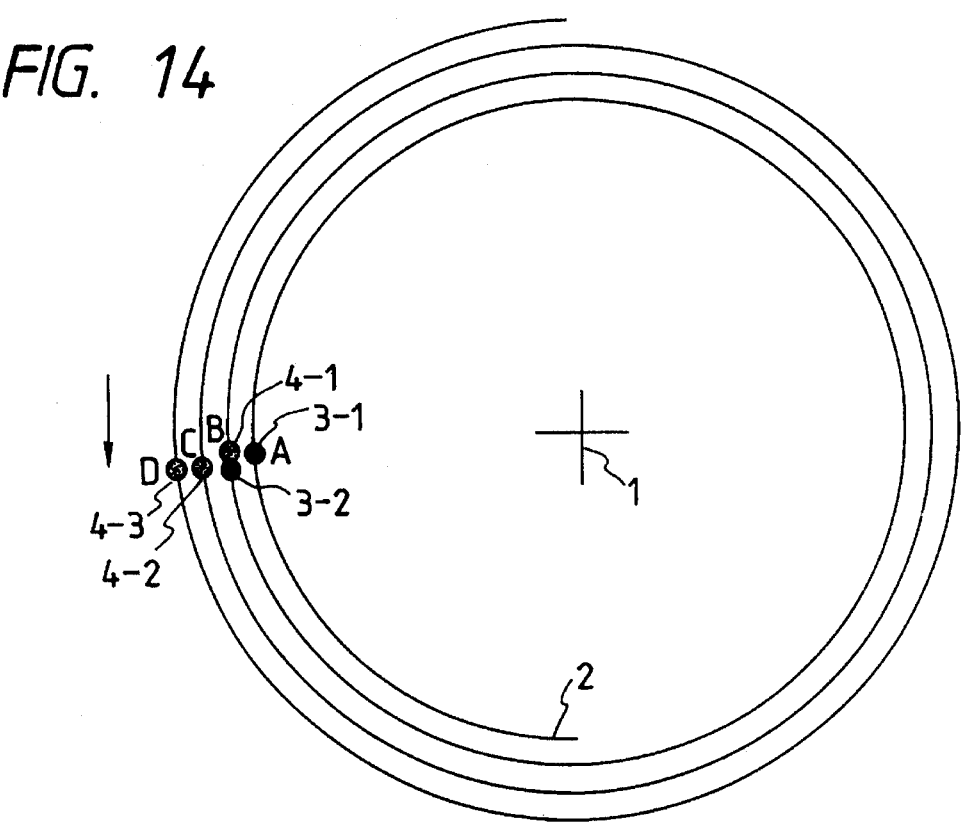
FIG. 14 is an explanatory view showing the optimization of the information recording/reproducing system of this invention.
Figure 15:
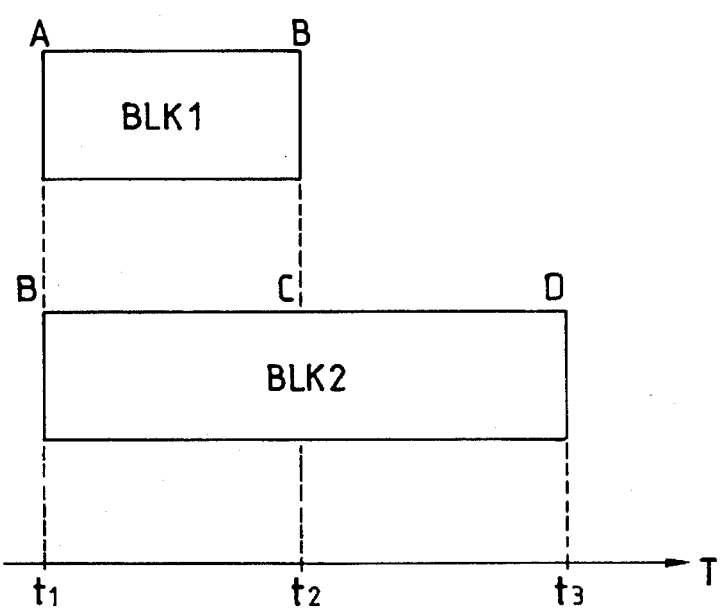
FIG. 15 is an explanatory view showing the optimization of the information recording/reproducing system of this invention.

Under such circumstances, a third system is adoptable. FIGS. 14 and 15 show this system. Referring to FIG. 14, the information is continuously recorded astride three track turns across the points A to D. It is assumed that the information starts at A and ends at D via B, C in sequence. The points A to D have such a relationship that the respective points are located in close proximity to the track turns adjacent to each other. The recording information is herein, as illustrated in FIG. 15, partitioned into data sequences BLK1, BLK2. When T=$t_1$, the beam spots 3, 4 (the beam spots 3-1, 4-1 in FIG. 14) start recording (reproducing) the data sequences BLK1, BLK2 from the points A, B, respectively. When T= $t_2$, the record (reproduction) for one track is ended. When the beam spots 3, 4 (beam spots 3-2, 4-2 in FIG. 14) reach the points B, C, the light source for the beam spot 3 is extinguished or the reproducing power level is set so that the information already recorded by the beam spot 4 is not overwritten by the beam spot 3. When T=$t_3$, the beam spot 4 continues recording (reproduction) as it is until reaching point D. With this operation, parallel recording and reproduction is not executed during T=$t_2$–$t_3$. Similar to the first and second systems, there is no necessity for jumping the tracks, and, even if the data sequence BLK2 is shortened, the efficiency does not drop.

Additionally, if the information quantity is equal to or larger than three tracks but less than four tracks, there may be employed the system in the first embodiment of this invention, which has already been explained in FIGS. 3 to 6. Besides, if the information quantity is equal to or larger than four tracks, the system of this invention, which has already been shown in FIGS. 3 to 6, may be used. For remaining tracks, the systems (the first through third systems) in the above cases may be applied.

As discussed above, the control means 7 judges the optimum recording/reproducing system corresponding to the information quantity. The magneto-optic disk apparatus using the plurality of beam spots are capable of performing parallel recording and reproduction by operating the magneto-optic head driving means 8. Besides, the information recorded by this magneto-optic disk apparatus does not exhibit drawbacks at all even if reproduced by a conventional magneto-optic disk apparatus having a single beam spot.

Further, the embodiments explained above have dealt with the case where the information is recorded and reproduced by use of the two beam spots according to the present invention. However, this invention is, as a matter of course, applicable to a case where the parallel recording and reproduction are performed by employing N numbers (three or more) beam spots. For example, when using the N numbers of beam spots for recording and reproducing the information extending over 2N sets of track turns, the information is partitioned into 2N sets of data sequences. The second half of the data sequences is recorded and reproduced in advance. Next, track-jumping (N+1) numbers of tracks on the upstream side is carried out. The first half of the data sequences may be recorded and reproduced. If this is done, it is possible to efficiently record and reproduce the information extending over approximately 2N numbers of tracks. Simultaneously, this is done keeping the compatibility with a magneto-optic disk apparatus having a single beam spot.

Similarly, the recording/reproducing systems optimal to a variety of information quantities can be applied to the arrangement of using the N numbers of beam spots. The information extending over the N numbers of tracks may be at first recorded and reproduced by the second system discussed above by partitioning the information into N numbers of data sequences. If the information quantity is less than N numbers of tracks, there may be applied a parallel recording/reproducing system sequentially employing beam spots N-1, N-2 . . . If the information quantity is more than the N numbers of tracks but less than the 2N numbers of tracks, the above recording/reproducing system is readily generalized and thus applicable.

In case of the (N+1) numbers of tracks, the third system discussed above can be applied. More specifically, when partitioning the information into the N-sets of data sequences, the recording and reproduction of the data sequences longer than or equal to one track may be assigned to the beam spot located the furthest downstream. In the case of (N+2) numbers of tracks, the information is partitioned into (N+2) sets of data sequences. The N numbers of data sequences in the second half thereof are previously recorded and reproduced. Next, track-jumping is employed to jump upstream. Two beam spots are capable of recording and reproducing the information for two tracks in parallel. Similarly considering, in the case of the (N+3) numbers through (2N) numbers of tracks, after jumping the tracks, the number of beam spots for effecting parallel recording and reproduction may be incremented by ones till it numbers N. Further, the recording/reproducing system of this invention exhibits a much greater advantageous effect in combination with an overwrite technique and a direct verify technique.

Figure 16:
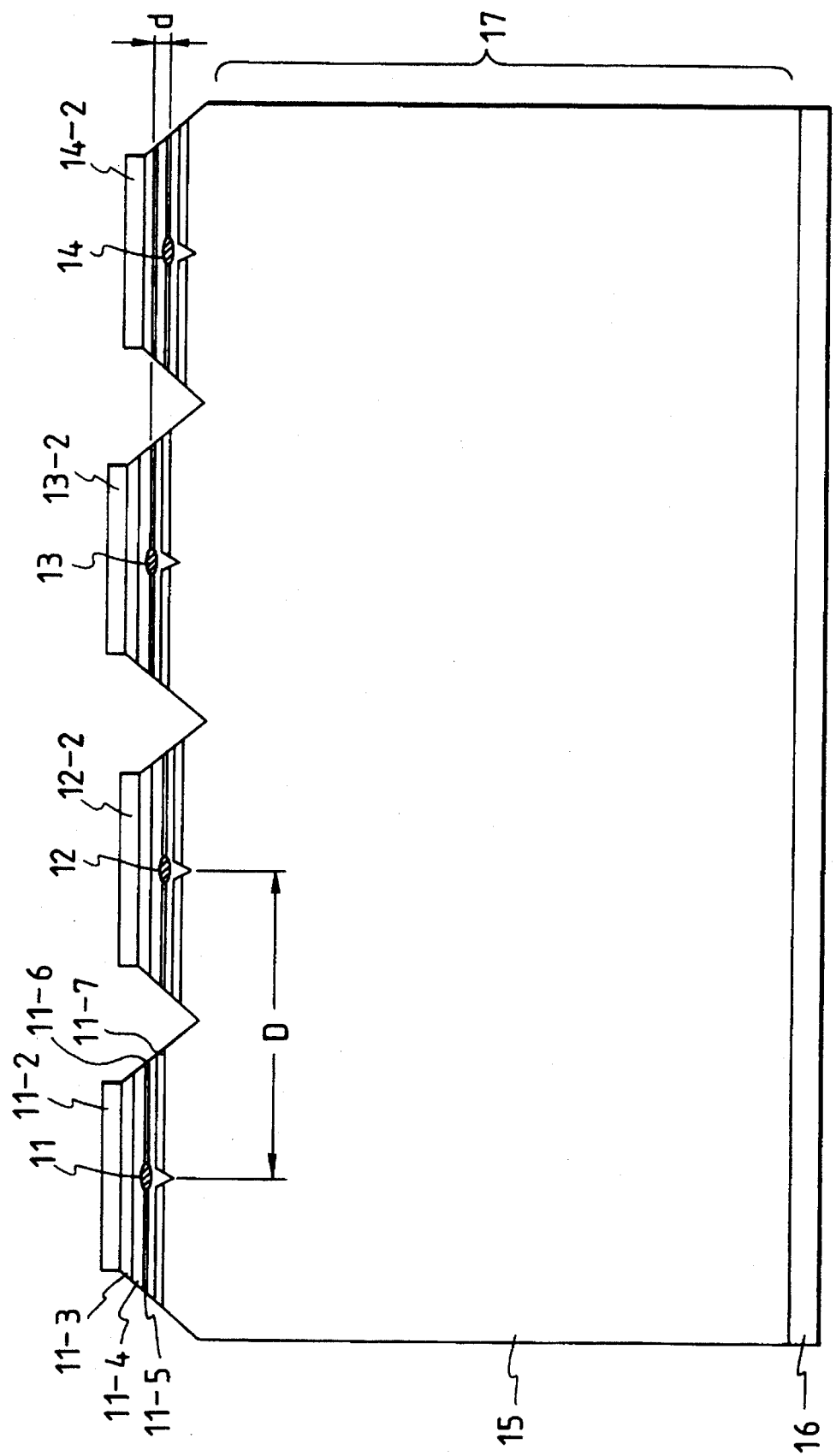
FIG. 16 is a schematic view illustrating a light source in an embodiment of this invention.

Another embodiment of the present invention will next be discussed with reference to FIGS. 16 to 20. To begin with, FIG. 16 illustrates the configuration of a semiconductor laser array serving as a light source unit of the magneto-optic disk apparatus of this invention. A semiconductor laser array chip 17 includes, e.g., four light emitting points 11 to 14. The four light emitting points are constructed on the same n-type GaAs substrate 15. The substrate has two heights in the arrowed directions. A typical internal stripe semiconductor laser structure is formed on this substrate. The chip construction of each semiconductor laser will be explained through the one including the light emitting point 11 as representative thereof. For instance, the numeral 11-2 designates a positive electrode; 11-3 is a p-type GaAs cap layer; 11-4 is an upper clad layer of p-type GaAlAs; 11-5 is an active layer of n-type GaAlAs; 11-6 is a lower clad layer of n-type GaAlAs; and 11-7 is a current block layer of p-type GaAlAs. Further, the numeral 16 denotes a negative electrode.

The construction of each laser chip including light emitting points 12 to 14 is also the same as the above-mentioned chip. Note that a V-shaped groove formed between the light emitting points is intended to be a shield to prevent thermal electrical crosstalk between the adjacent light emitting points. For example, as illustrated in FIG. 16, the light emitting points 11, 13 among the four light emitting points 11 to 14 are formed on the substrate flush with each other. The light emitting points 12, 14 are also formed on the substrate flush with each other. d is the relative height difference therebetween, and D is the interval between the light emitting points.

Figure 17:
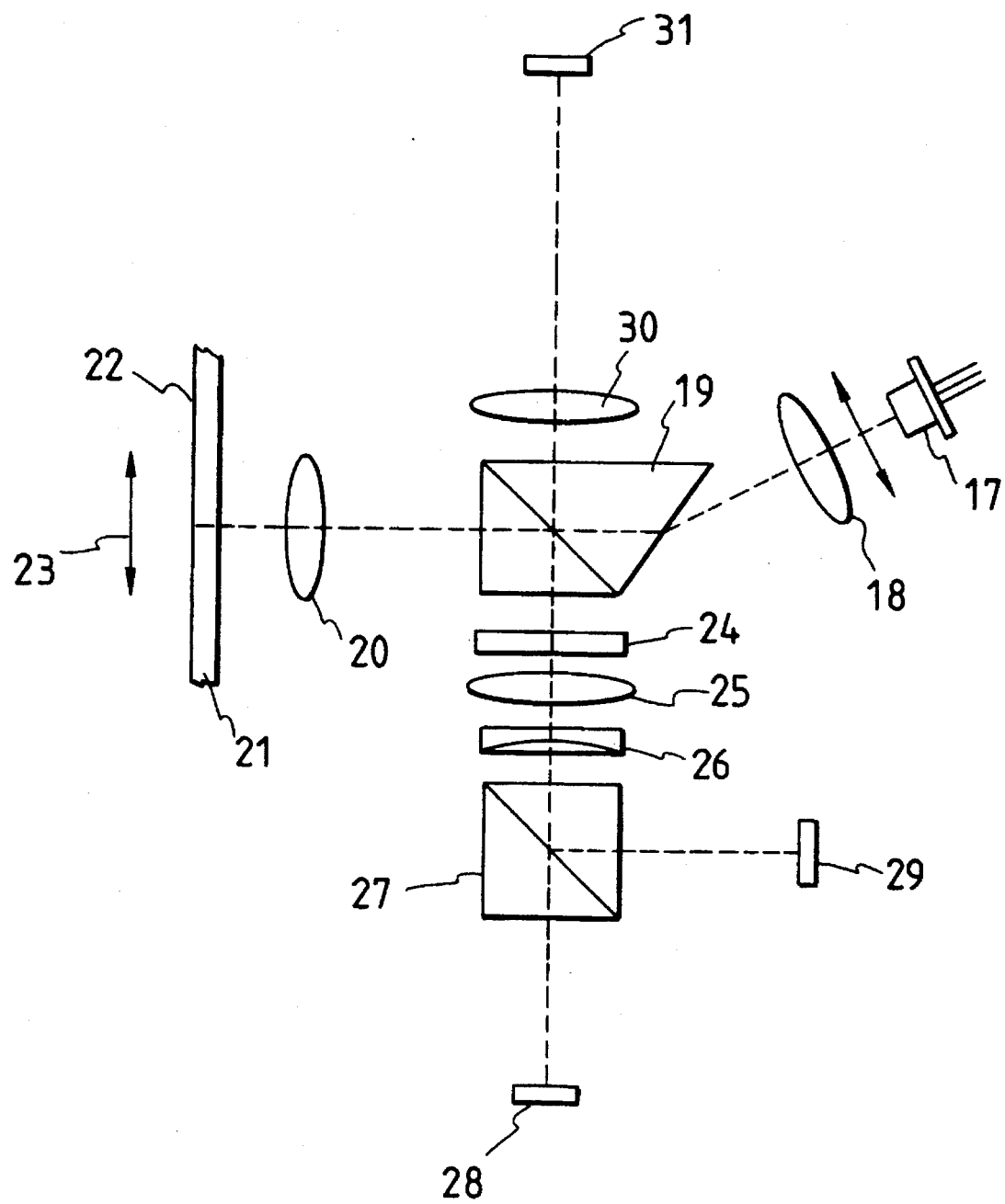
FIG. 17 is a schematic view illustrating an optical system of the embodiment of this invention.
Figure 18:
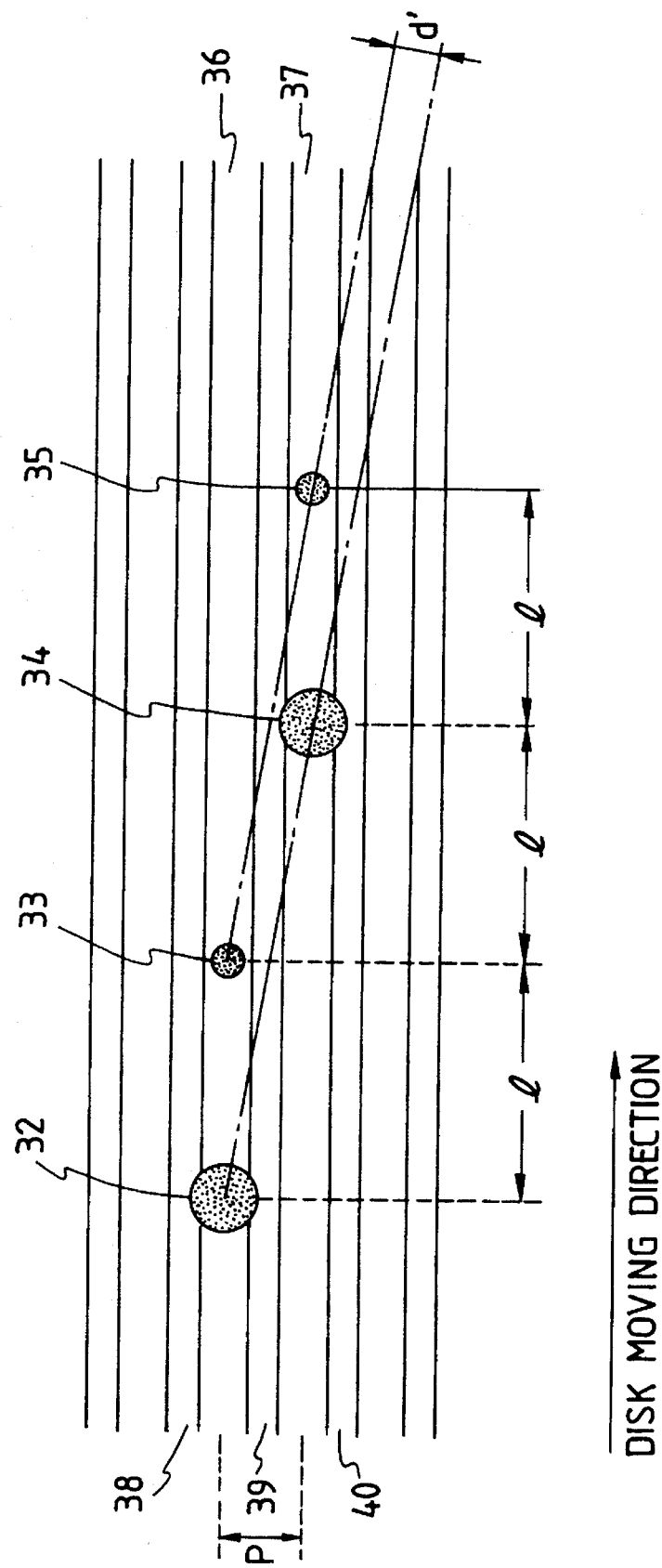
FIG. 18 is an explanatory view showing a placement of beam spots on a recording medium in the embodiment of this invention.

FIG. 17 depicts the construction of the magneto-optic disk apparatus using the semiconductor laser array chip 17 of FIG. 16. Beams of light outgoing from the semiconductor laser array chip 17 are collimated by a collimator lens 18. The collimated beam enters a polarizing beam splitter 19, wherein an anisotropic beam configuration is produced. The anisotropic shaped beams are imaged through an objective lens 20 in the form of four microbeam spots on a magnetic film surface 22 of a magneto-optic disk 21 capable of, e.g., optical modulation overwriting. Herein, an arrowhead 23 indicates the track direction on the magneto-optic disk. Next, the beam spots on a magneto-optic disk 21 will be explained with reference to FIG. 18. The light emitting points 11 to 14 are imaged in the form of microbeam spots 32 and 35 on arbitrary adjacent track turns 36, 37 through the optical system shown in FIG. 17. The light emitting point 11 corresponds to beam spot 32 for overwriting on the track 36 in FIG. 18. The light emitting point 12 corresponds to the beam spot 33 for direct verifying of recording. The light emitting point 13 corresponds to the overwrite beam spot on the track 27. Then, the light emitting point 14 corresponds to the direct verify beam spot 35. The numerals 38 and 40 designate guide grooves for tracking, and the track-to-track pitch is denoted by P. For instance, the light emitting points 11, 12 and the light emitting points 13, 14 are located on track turns adjacent to each other. For this purpose, the semiconductor laser array chip 17 in FIG. 17 may be turned by a small angle Θ from a track direction 23. The beams emitted from the semiconductor laser 17 are, as illustrated in FIG. 17, polarized substantially in the arrowed directions on the sheet of drawing. Selected is a beam splitter exhibiting a characteristic to reflect, e.g., S-polarized light at almost 100% efficiency. With this arrangement, the beams are substantially collimated in the track directions 23 on the magneto-optic disk 21.

For positioning two couples of beam spots on track turns adjacent to each other, the necessary physical parameters for the optical system may be set as follows. To be specific, let $f_1$ be the focal length of the collimator lens, and let $f_2$ be the focal length of the objective lens. A lateral magnification of the optical system is given by $f_2/f_1$ in the radial direction. Hence, an interval between the beam spots in the radial direction is given substantially by the following formula:

$$2d \times \frac{f_2}{f_1} = P \qquad (1)$$

Therefore, if the track P is predetermined, the equation is:

$$d = \frac{f_1}{2f_2} \times P \qquad (1)'$$

For example, when P=1.5 µm, f=8 mm, and $f_2$=3 mm, the height difference is given such as d=2 µm. The rotational angle is approximately 1.4°. Note that d' in FIG. 18 expresses that the height difference in FIG. 16 is imaged on the track of the magneto-optic disk 21 through the optical system shown in FIG. 17.

A beam spot interval l in the track direction is expressed by the following formula:

$$l = \frac{f_2}{\alpha f_1} \times D \qquad (2)$$

where α is the beam shaping ratio. In this case, when D= 80 µm, $f_1$=8 mm, $f_2$=3 mm, and α=2, the beam spot interval l is given by l=15 µm.

If it is presumed that the magneto-optic recording medium 21 is capable of optical modulation overwriting, the beam spots 32, 34 are respectively formed on the tracks 36, 37 when overwritten in a state where a bias magnetic field is applied (not shown). In this case, however, the light source involves the use of comparatively high power level binary optical pulses $P_1$, $P_2$ ($P_1$>$P_2$) for writing the information. Then, magneto-optic pits having vertical magnetization directed opposite to each other are formed on the track, corresponding to high-and-low levels of the optical pulses. Further, the beam spots 33, 35 respectively correspond to the beam spots 32, 34 in order to read the information written by the beam spots 32, 34. The light source employed herein involves the use of a beam of a fixed value $P_3$ ($P_2$>$P_3$) of a comparatively low power level. The information immediately after being recorded is thereby reproduced (directly verified). Note that $P_1$ to $P_3$ are light quantities on the magneto-optic recording medium 21.

Given next is an explanation of a method for detecting an RF signal and a servo signal through the optical system of FIG. 17. The beams by which four beam spots 32 to 35 are formed on the magneto-optic disk 21 are reflected by a magnetic film 22. The reflected beams pass through the objective lens 20 and become collimated. Subsequently, the beams are further reflected by the polarizing beam splitter 19 and are led to an RF signal/servo signal detection system. At this time, the polarizing characteristics of the polarizing beam splitter 19 are set such that a P-polarized light reflectivity $R_P$= 10–30%, and an S-polarized light reflectivity $R_S$=100%. Then, the Kerr rotational angle is increased, whereby detection exhibiting a high S/N ratio can be attained. Turned by 45° is a polarizing direction of the beam passing through a halfwave plate 24 the optical axis of which is twisted through 22.5° with respect to the P-polarized light component. The beam passing through a condenser lens 25, a cylindrical lens 26 and a polarizing beam splitter 27 is split into two beams. The split beams are respectively led to photodetectors 28, 29. Note that the cylindrical lens 26 is interposed for performing an autofocus (AF) operation by an astigmatism method, and a bus is twisted by 45° in the track direction 23.

Next, by referring FIG. 19 there will be explained photodetectors 28, 29 and a method for detecting the beam spots on the photodetectors and the RF/servo signals. The photodetector 28 consists of four light receiving areas 41 to 44. The light receiving area 41 is divided into subareas 41-1 through 41-4. Beam spots 45 to 48 corresponding to the beam spots 32 to 35 on the magneto-optic disk 21 are imaged in the respective light receiving areas. When the focal length $f_3$ of the condenser lens is set to 30 mm, each beam spot interval is approximately 150 µm. Similarly the photodetector 29 also consists of four light receiving areas 49 to 52. The light receiving area 49 is a quadrant sensor. Beam spots 53 to 56 corresponding to the beam spots 32 to 35 are imaged in the respective light receiving areas. The beam spot on the photodetector is shown as the one approximate to a minimum scatterd circle of confusion of the cylindrical lens 26. This is a state of being correctly AF-controlled (autofocus controlled).

Figure 19:
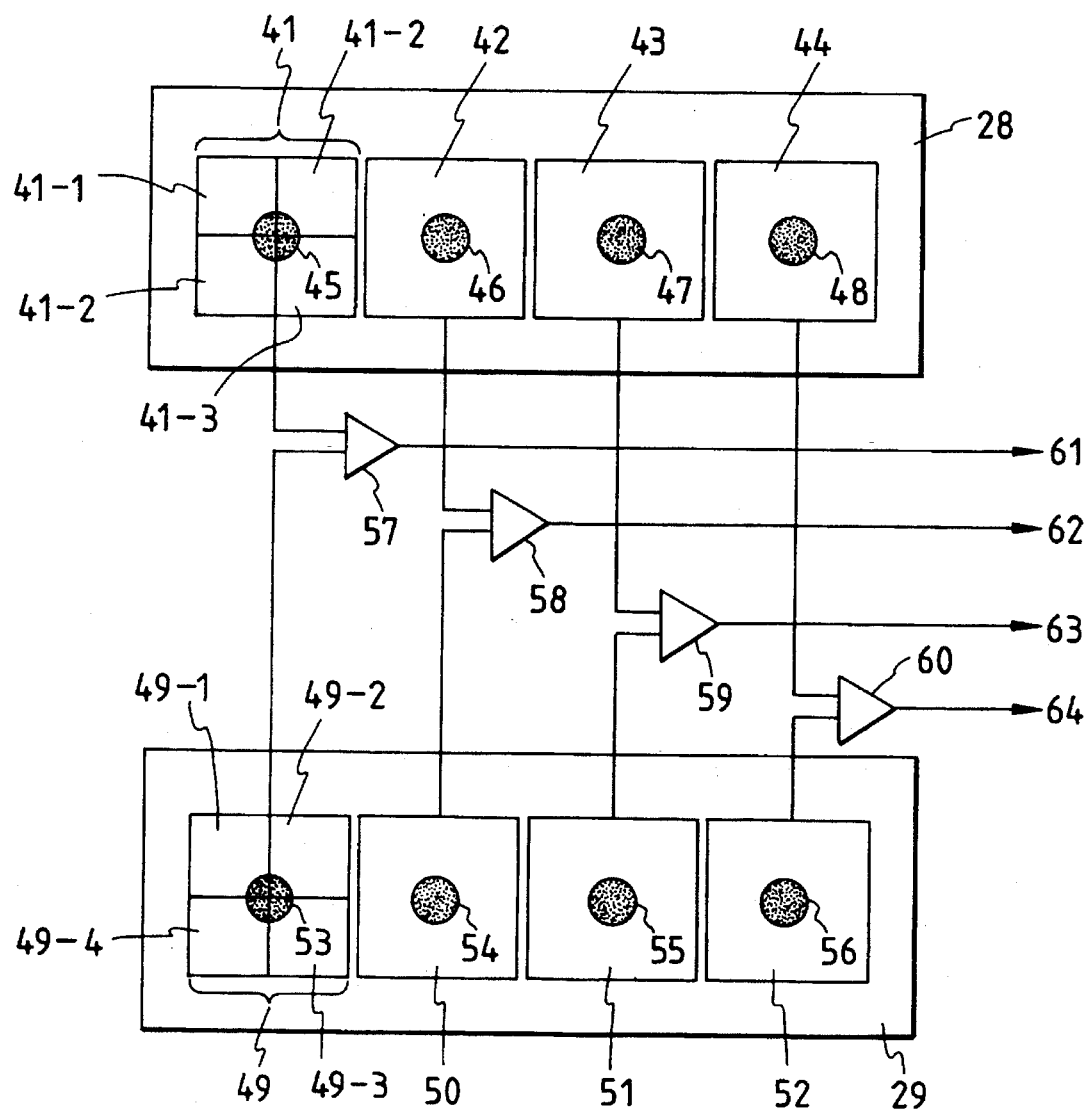
FIG. 19 is an explanatory view showing an RF/servo signal detecting method in the embodiment of this invention.

In accordance with an embodiment of FIG. 19, the beam spot 32 on the magneto-optic disk, i.e., the beam spots 45, 53 on the photodetectors are employed for detecting the servo signals. A focus error signal involves the use of a difference signal of a diagonal sum of the quadrant sensor. Further, an AF signal in the sensor 41 uses a suffix put on the sensor and is expressed by the following formula:

$$AF_1=(1+3)-(2+4) \quad (3)$$

In addition, when taking the AF signal by use of an output of the sensor 49, the AF signal also employs the suffix put on the sensor and is expressed by the following formula (this is not shown, and the numerals are marked with (') to distinguish them from formula (3).

$$AF_2=(1'+3')-(2'+4') \quad (4)$$

The AF signal may be generated by using the outputs of both of the formula (3) and (4)

$$AF=AF_1+AF_2 \quad (5)$$

When set as expressed by the formula (5), a focus offset caused due to a birefringence of the magneto-optic disk 21 can be effectively prevented.

Further, an auto tracking (AT) signal involves the use of a difference signal of the sensor divided by dividing lines extending in the track direction (push-pull method). The AT signal in the sensor 41 is expressed by the following formula (6) using the suffix put on the sensor.

$$AT_1=(2+3)-(1+4) \quad (6)$$

Herein, as in the case of the AF signal, the output of the sensor 49 may be employed, or the outputs of both of the sensors 41 and 49 may also be used. There has been already proposed a method of stably applying the tracking servo to the plurality of beam spots.

Next, the system for detecting the RF signal will be explained. The beam spots 32, 34 are at first formed on the magneto-optic disk when overwritten. Then, the information immediately after being recorded is reproduced by using the beam spots 33, 35 (beam spots 46, 54 and 48, 56 on the photodetectors) while writing the information thereon. In this case, the information from the beam spot 33 serves to differentially amplify outputs of the photodetectors 42, 50 by using a differential amplifier 58. The information from the beam spot 35 serves to differentially amplify outputs of the photodetectors 44, 52 by using a differential amplifier 60. As a result, magneto-optic signals 62, 64 can be obtained. When normally reproduced, the information is reproduced by the beam spots 33, 35 while taking the servo with the beam spot 32 on the magneto-optic disk. In this case, the light source corresponding to the beam spot 34 may not be lit up. If done in this way, the beam spots 32, 34 can be dedicated to only OW (overwriting) (the beam spot 32 is also used for detecting the servo signal). It therefore follows that laser noise reducing means (high-frequency superposition, etc.) may be provided for only the beam spots 33, 35. Further, the servo and RF can be made independent, and, hence, there is no necessity for fetching the feeble magneto-optic signals out of the divided sensors like the sensors 41, 49. This is advantageous in terms of thermal noises of the pre-amplifier (the quadrant sensor is provided with the independent pre-amplifier, and, when detecting the magneto-optic signal therefrom, the thermal noise is doubled). In addition, preformatted address information on the magneto-optic disk 21 may be read by the beam spots 32, 34 apart from the magneto-optic signal. In this instance, the information from the beam spot 32 serves to amplify a sum signal of the photodetector 41 and a sum signal output of the photodetector 49 by using an adder 57. The information from the beam spot 34 serves to amplify outputs of the photodetectors 43, 51 through an adder 59. Preformat signals 61, 63 can be thereby obtained. As explained above, when the system according to the present invention is applied to the magneto-optic disk apparatus capable of overwriting and direct verifying, the information transfer rate can be further improved.

Figure 20:
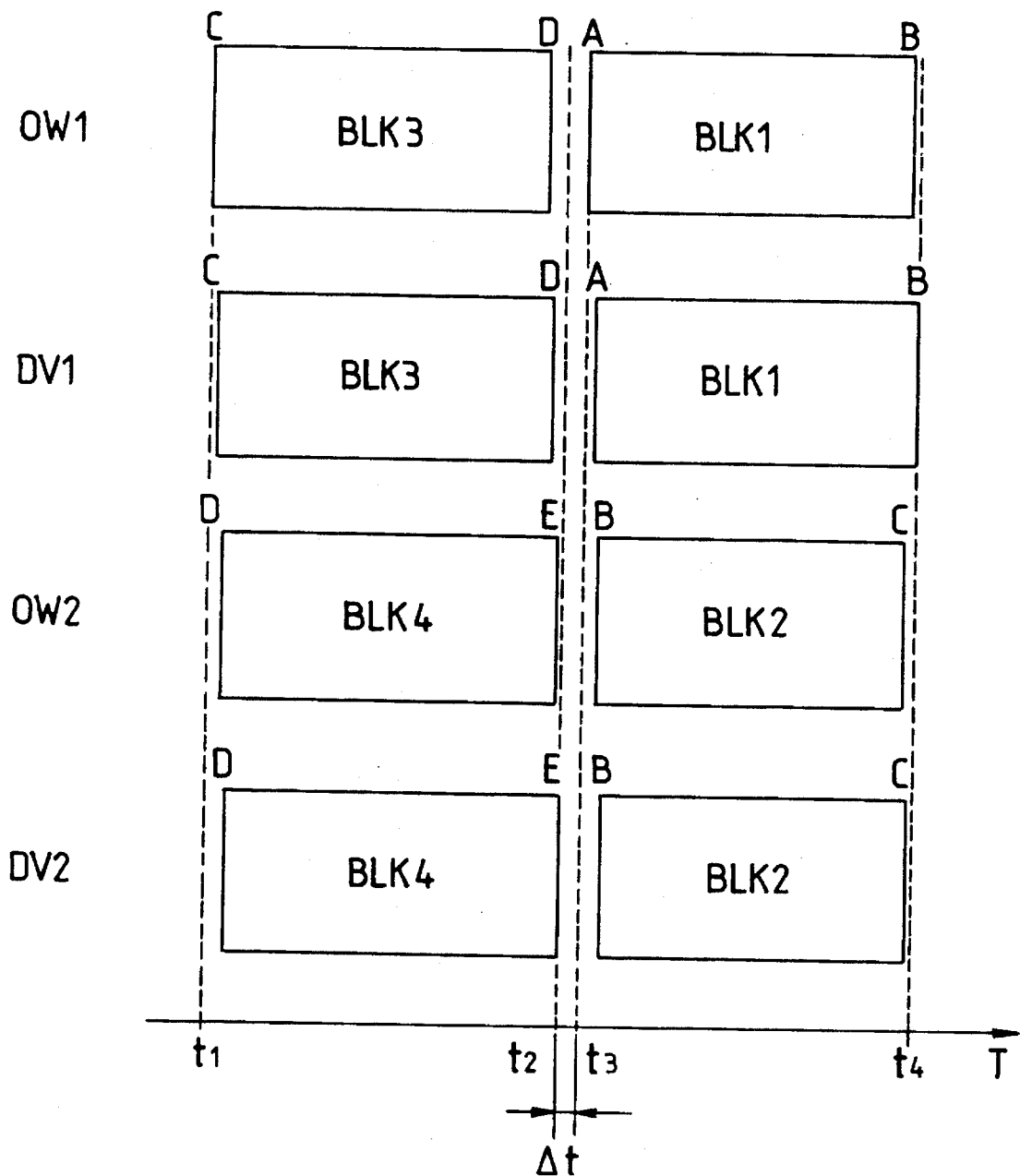
FIG. 20 is an explanatory view showing how the information recording/reproducing system of this invention is applied.

Referring to FIG. 20 is a case where the continuous information existing astride four tracks across the points A to E is overwritten on and, immediately after this, verified from the medium having the single helical track identical with that in FIGS. 3 to 6. Turning to FIG. 20, the four beam spots 32, 33, 34, 35 are expressed respectively by the symbols OW1, DV (direct verify)1, OW2, DV2. Herein, the information is divided into four sets of data sequences BLK1 to BLK4. Recording and reproducing functions are assigned to each beam spot. When T=$t_1$, the beam spot OW1 starts overwriting the data sequence BLK from the point C. The beam spot DV1 reaches the point C after a time corresponding to a beam spot interval δt has elapsed and starts verifying the data immediately after recording. Besides, the beam spot OW2 starts overwriting the data sequence BLK4 after δt from D. The beam spot DV2 comes to D after δt and starts verifying the data immediately after recording.

In accordance with this embodiment, the beam spot interval is substantially 15 µm, and, therefore, δ is substantially shorter than a time for which the beam spot passes through one sector. If the magneto-optic disk 21 makes one revolution, the beam OW1 reaches D and finishes overwriting BLK3. Hereafter, the beam spots finish overwriting and verifying the data at intervals of δt (T= $t_2$). Then, the four beam spots jump by three tracks in the upstream direction. The beam spots OW1, DV1 move upstream of the point A, while OW2, DV2 move towards upstream of the point B. A moving time or a settling time of the beam spot is given by $\Delta t = t_3 - t_2$. When T=$t_3$, OW1 at first reaches A and starts overwriting the data sequence BLK1. Hereafter, DV1, OW2, DV2 starts overwriting and verifying the data at intervals of δt. When the magneto-optic disk 21 makes one further revolution, the beam spot OW2 at first reaches point C and finishes overwriting the data sequence BLK2. Hereafter, the beam spots DV2, OW1, OW2 sequentially finish overwriting and verifying the data (T=$t_4$).

In this manner, the magneto-optic disk apparatus available as a current product, which has the single beam spot, makes three revolutions for deleting/recording/verifying per one track, thus recording and reproducing the information. As compared with this, the apparatus in accordance with the embodiment explained above is capable of recording and reproducing the information through one revolution per one track. Further, the conventional apparatus requires 12 revolutions of the disk to record and reproduce the information extending over 4 track turns. In comparison with this, according to the present invention, merely two revolutions of the disk may suffice by enhancing the recording/reproducing efficiency. Hence, the data transfer rate can be improved a maximum of six times.

As stated in detail, the use of the system according to this invention exhibits the following excellent effects. The optical information recording/reproducing apparatus such as the magneto-optic disk apparatus records and reproduces the information in parallel on and from a recording medium including the helical track by using a plurality of beam spots. The same apparatus is capable of recording and reproducing a comparatively large quantity of information extending over several tracks most efficiently. Besides, the information recorded can be reproduced by the optical disk apparatus having a single beam spot.

It is apparent that, in this invention, a wide range of different working modes can be formed based on the invention without deviating from the spirit and scope of the invention. This invention is not restricted by its specific working modes except being limited by the appended claims.

What is claimed is:

1. An optical information recording and/or reproducing method for recording or reproducing information in parallel from a first point to a second point on an optical information recording medium in which at least (N+1) track turns are provided between the first and second points on a helical track thereof, where N is an integer greater than or equal to two, using N light beams forming N beam spots via an optical system irradiating respectively N track turns adjacent to each other in the radial direction of the helical track, wherein said method comprises the steps of:

recording or reproducing one portion of the information with the N beam spots from a third point between the first and second points to the second point;

moving the N beam spots in a radial direction of the helical track so that the N beam spots move from the third point to a track turn upstream thereof; and recording or reproducing the other portion of information not including the one portion of the information with the N beam spots from the first point to the third point.

2. The optical information recording and/or reproducing method according to claim 1, wherein an array of the information before recording is the same as an array of the information after recording when effecting the recording operation.

3. The optical information recording and/or reproducing method according to claim 1, further comprising the steps of positioning at least two beam spots per one track turn, detecting light beams reflected from track turns irradiated with beam spots located on an upstream side of the helical track for use in an overwriting operation, and detecting light beams reflected from track turns irradiated with beam spots located on a downstream side of the helical track for use in a verifying operation immediately after recording.

4. An optical information recording and/or reproducing method for recording or reproducing information in parallel from a first point to a second point on an optical information recording medium in which at least (N+1) track turns are provided between the first and second points on a helical track thereof, where N is an integer greater than or equal to two, using N light beams forming N beam spots via an optical system irradiating respectively N track turns adjacent to each other in the radial direction of the helical track, wherein said method comprises the steps of:

recording and reproducing one portion of the information with at least one of the N beam spots from a third point between the first point and the second point to the second point;

moving the N beam spots in a radial direction of the helical track so that the N beam spots move from the third point to a track turn upstream thereof; and recording or reproducing the other portion of information not including the one portion of the information with the N beam spots from the first point to the third point.

5. The optical information recording and/or reproducing method according to claim 4, wherein an array of the information before recording is the same as an array of the information after recording when effecting the recording operation.

6. The optical information recording and/or reproducing method according to claim 4, further comprising the steps of positioning at least two beam spots per one track turn, detecting light beams reflected from track turns irradiated with beam spots located on an upstream side of the helical track for use in an overwriting operation, and detecting light beams reflected from track turns irradiated with beam spots located on a downstream side of the helical track for use in a verifying operation immediately after recording.

7. An optical information recording and/or reproducing method for recording or reproducing information in parallel from a first point to a second point on an optical information recording medium in which at least (N+1) track turns are provided between the first and second points on a helical track thereof, where N is an integer greater than or equal to two, using N light beams forming N beam spots via an optical system irradiating respectively N track turns adjacent to each other in the radial direction of the helical track, wherein said method comprises the steps of:

recording or reproducing one portion of the information with the N beam spots from the first point to a third point between the first point and the second point; and recording and reproducing the other portion of information providing the one portion of the information with a beam spot furthest downstream of the beam spots from the third point to the second point.

8. The optical information recording and/or reproducing method according to claim 7, further comprising the steps of positioning at least two beam spots per one track turn, detecting light beams reflected from track turns irradiated with beam spots located on an upstream side of the helical track for use in an overwriting operation, and detecting light beams reflected from track turns irradiated With beam spots located on a downstream side of the helical track for use in a verifying operation immediately after recording.

9. An optical information recording and/or reproducing apparatus for recording or reproducing information in parallel from a first point to a second point on an optical information recording medium in which at least (N+1) track turns are provided between the first and second points on a helical track thereof, where N is an integer greater than or equal to two, using N light beams forming N beam spots via an optical system irradiating respectively N track turns adjacent to each other in the radial direction of the helical track, wherein said apparatus comprises:

first controlling means for controlling said apparatus to record or reproduce one portion of the information with the N beam spots from a third point between the first and second points to the second point;

moving means for moving at least one of the N beam spots from in a radial direction of the helical track so that at least one of the N beam spots move from the third point to a track turn upstream thereof; and second controlling means for controlling said apparatus to record or reproduce the other portions of the information not including the one portion of information with at least one of the N beam spots from the first point to the third point.

10. An optical information recording and/or reproducing apparatus for recording or reproducing information in parallel from a first point to a second point on an Optical information recording medium in which at least (N+1) track turns are provided between the first and second points on a helical track thereof, where N is an integer greater than or equal to two, using N light beams forming N beam spots via an optical system irradiating respectively N track turns adjacent to each other in the radial direction of the helical track, wherein said apparatus comprises:

first controlling means for controlling said apparatus to record or reproduce one portion of the information with at least one of the N beam spots from a third point between the first point and the second point to the second point;

moving means for moving the N beam spots in a radial direction of the helical track so that the N beam spots move from the third point to a track turn upstream thereof; and second controlling means for controlling said apparatus to record and/or reproduce the other portion of information not including the one portion of the information with the N beam spots from the first point to the third point.

11. An optical information recording and/or reproducing apparatus for recording or reproducing information in parallel from a first point to a second point on an optical information recording medium in which at least (N+1) track turns are provided on a helical track thereof, where N is an integer greater than or equal to two, wherein said apparatus comprises:

light emitting means for emitting N light beams;

positioning means for respectively converging the N light beams on N track turns adjacent to each other in a radial direction of the helical track to position the N light beams to form N beam spots through an optical system;

controlling means for controlling said apparatus to record or reproduce one portion of the information with N beam spots from the first point to a third point between the first point and the second point; and controlling means for controlling said apparatus after recording or reproducing the one portion of information to record or reproduce the other portion of the information not including the open portion of information with a beam spot furthest downstream of the N beam spots from the third point to the second point.

12. An optical information recording and/or reproducing method for recording or reproducing information in parallel from a first point to a second point on an optical information recording medium in which at least (N+1) track turns are provided between the first and second points on a helical track thereof, where N is an integer greater than or equal to two, using N light beams forming N beam spots via an optical system irradiating respectively N track turns adjacent to each other in a radial direction of the helical track, wherein said method comprises the steps of:

recording and reproducing one portion of the information with at least one of the N beam spots from a third point between the first point and the second point to the second point;

moving at least one of the N beam spots in a radial direction of the helical track so that the at least one of the N beam spots move from the third point to a track turn upstream thereof; and recording or reproducing the other portion of the information not including the one portion of the information with at least one of the N beam spots from the first point to the third point.

13. A method according to claim 12, wherein an array of the information before recording is the same as an array of the information after recording when effecting the recording operation.

14. A method according to claim 12, further comprising the steps of positioning at least two beam spots per one track turn, detecting light beams reflected from track turns irradiated with beam spots located on an upstream side of the helical track for use in an overwriting operation, and detecting light beams reflected from track turns irradiated with beam spots located on a downstream side of the helical track for use in a verifying operation immediately after recording.

15. An optical information recording and/or reproducing method for recording or reproducing information in parallel from a first point to a second point on an optical information recording medium in which at least (N+1) track turns are provided between the first and second points on a helical track thereof, where N is an integer equal to or greater than two, using N light beams forming N beam spots via an optical system irradiating respectively N track turns adjacent to each other in a radial direction of the helical track, wherein said method comprises the steps of:

recording or reproducing one portion of the information with at least one of the N beam spots from a third point between the first point and the second point to the second point;

moving at least one of the N beam spots in a radial direction of the helical track so that at least one of the N beam spots moves from the first point to a fourth point on an upstream track turn;

moving at least one of the N beam spots from the fourth point to the first point; and recording or reproducing the other portion of the information not including the one portion of the information with at least one of the N beam spots from the first point to the third point.

16. A method according to claim 15, wherein an array of the information before recording is the same as an array of the information after recording when effecting the recording operation.

17. A method according to claim 15, further comprising the steps of positioning at least two beam spots per one track turn, detecting light beams reflected from track turns irradiated with beam spots located on an upstream side of the helical track for use in an overwriting operation, and detecting light beams reflected from track turns irradiated with beam spots located on a downstream side of the helical track for use in a verifying operation immediately after recording.

* * * * *

UNITED STATES PATENT AND TRADEMARK OFFICE
CERTIFICATE OF CORRECTION

PATENT NO. : 5,485,438  Page 1 of 3
DATED : January 16, 1996
INVENTOR(S) : OSAMU KOYAMA It is certified that error appears in the above-indentified patent and that said Letters Patent is hereby corrected as shown below:

ON THE COVER PAGE

[57] ABSTRACT

Line 1, "Disclosed is an" should read --An--.

Line 2, "for recording or reproducing" should read --records and reproduces--.

Line 3, "in which at" should read --.  At--.

Line 4, "herein" should be deleted.

Line 5, "track by" should read --track,--.

Line 6, "converging, when" should be deleted, "is" should read --being--, after "interger", "being" should read --at least equal to--, and "or larger than" should be deleted.

Line 7, "two," should read --, and--, and after "beams" should be inserted --are provided--.

Line 10, "and positioning" should read --.--, "the" should read --The--, and after "beams" should be inserted --are positioned--.

Line 11, "portion" should read --segment--.

Line 12, "by N numbers of beam spots" should be deleted.

UNITED STATES PATENT AND TRADEMARK OFFICE
CERTIFICATE OF CORRECTION

PATENT NO. : 5,485,438

DATED : January 16, 1996

INVENTOR(S) : OSAMU KOYAMA

It is certified that error appears in the above-indentified patent and that said Letters Patent is hereby corrected as shown below:

[57] ABSTRACT (Continued)

Line 13, after "duced" --by N number of beam spots-- should be inserted.

Line 14, "towards" should read --toward--.

Line 16, "of N numbers of beam" should be deleted.

Line 17, "spots" should be deleted.

Line 19, "towards" should read --toward--.

COLUMN 7

Line 15, "is" (second occurrence) should read --in--.

COLUMN 9

Line 66, "track 27." should read --track 37.--.

COLUMN 11

Line 27, "Similarly" should read --Similarly,--.

UNITED STATES PATENT AND TRADEMARK OFFICE
CERTIFICATE OF CORRECTION

PATENT NO.    : 5,485,438                    Page  3  of  3
DATED         : January 16, 1996
INVENTOR(S)   : OSAMU KOYAMA It is certified that error appears in the above-indentified patent and that said Letters Patent is hereby corrected as shown below:

COLUMN 14

Line 62, "tion providing" should read --tion not including--.

Line 63, "the beam" should read --the N beam--.

COLUMN 15

Line 4, "With" should read --with--.

Line 31, "Optical" should read --optical--.

COLUMN 16

Line 6, "open" should read --one--.

Signed and Sealed this

Seventeenth Day of September, 1996

Attest:

BRUCE LEHMAN

*Attesting Officer*     *Commissioner of Patents and Trademarks*